May 20, 1930.  C. B. LANCASTER  1,759,013
FILTER
Filed Aug. 27, 1928
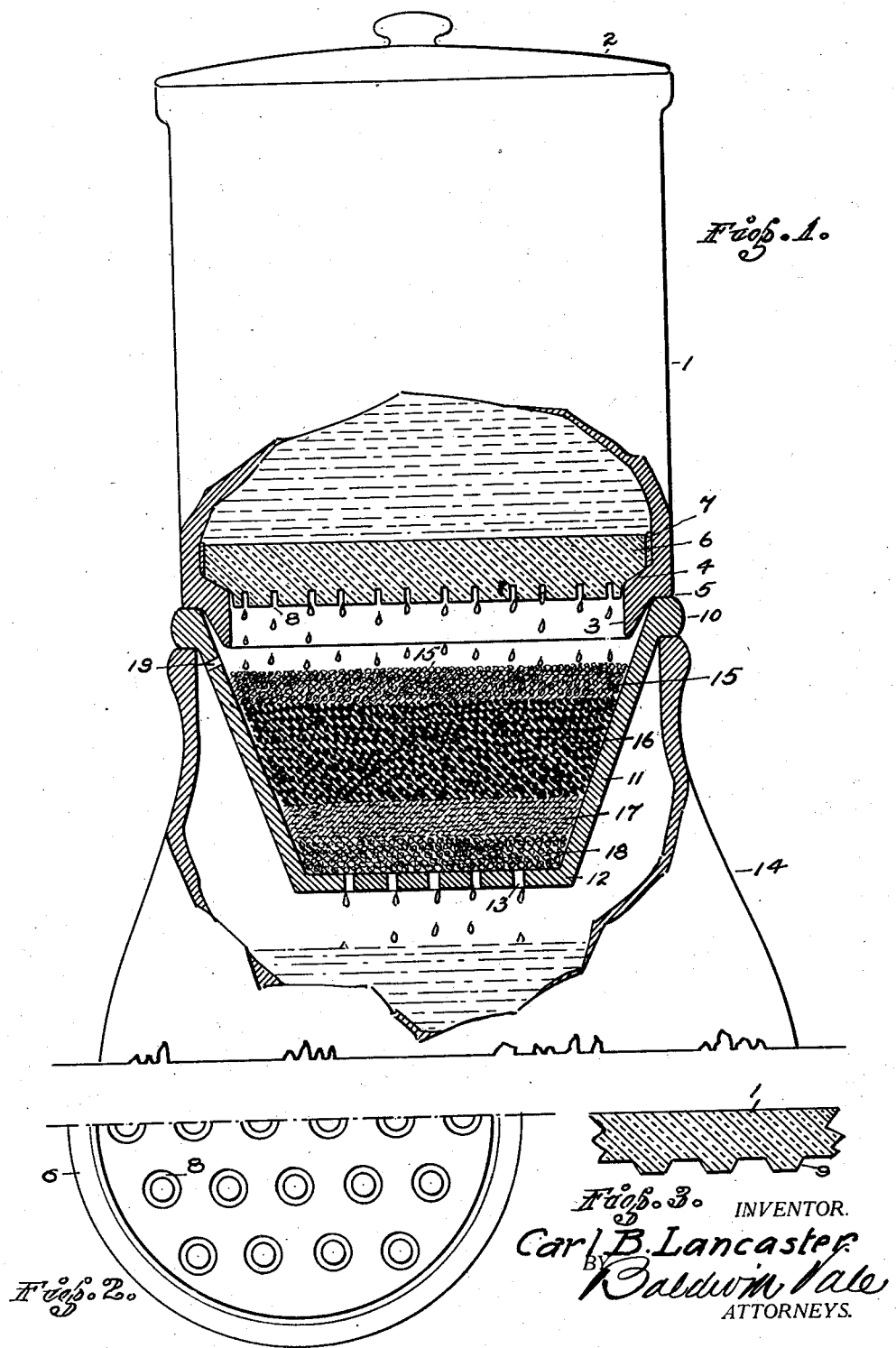
INVENTOR.
Carl B. Lancaster
BY Baldwin Vale
ATTORNEYS.

Patented May 20, 1930

1,759,013

UNITED STATES PATENT OFFICE

CARL B. LANCASTER, OF ALAMEDA, CALIFORNIA

FILTER

Application filed August 27, 1928. Serial No. 302,199.

This invention relates to improvements in filters and more particularly to gravity filters for purifying drinking water.

The principal object of the invention is to remove bacteria, taste, color, odor, alkalies, sediment and other suspended matter from natural water to render it healthful for drinking purposes. Another object is to provide a filter of this nature, simple in construction and effective in operation, suitable for domestic purposes. Other objects and advantages will appear as this description progresses.

In this specification and the accompanying drawings the invention is shown in its present preferred form, but I do not wish to be understood as confining it to this form because it may be embodied in other forms, and it is also to be understood that in and by the claims following the description it is desired to cover the invention in whatsoever form it may be embodied.

In the drawings, Fig. 1 is an elevation of a filter constructed in accordance with this invention, portions being broken away in vertical section to disclose the inter-relation of parts. Fig. 2 is a detail plan view looking at the under surface of the porous stone plate forming the bottom of the top reservoir. Fig. 3 is a cross-section of a modified form of the same.

In detail the construction illustrated in the drawings includes the top reservoir 1 preferably a glazed jar, of porcelain or a suitable vitrified composition, having the top cover 2. This reservoir has the inset flange 3 forming the internal shoulder at 4 and the external shoulder at 5.

The bottom of this reservoir is formed by the plate 6 of unglazed porcelain or any natural porous material, of which there are many available, and conventionally used for the purpose. This bottom rests upon the shoulder 4 and is cemented at 7 to hermetically seal its circumference to the inner walls of the reservoir to compel the water contained therein to seep through the plate 6.

Thus far the top reservoir 1 is conventional in general construction. Such reservoirs are subject to one great disadvantage. If they are not set perfectly level, the seepage through the plate 6 will travel along the under surface of the stone to a low point before precipitating into the filtering media thereunder.

One of the particular features of my invention is the correction of this disadvantage. This is accomplished by counter-boring into the under surface of the stone 6, the annular holes 8, see Fig. 2. Such stones are usually of a soft chalky nature presenting no great resistance to the entrance of a hollow boring tool suitable for boring these annular holes 8. A plate or gig is placed thereover, guiding and spacing the boring tool to distribute the holes 8 evenly over the under surface of the plate 6. This method of boring is preferred for the treatment of the conventional natural stone available in the open market. If the stone 6 is formed or molded of plastic material, as may be readily done, it can be given the form shown in Fig. 3 in which dependent embossments 9 are provided on the under surface of the filter stone 6 accomplishing the same function as the holes 8.

Water seeping through the filtering stone between the holes 8 or the embossments 9 will travel along the under surface of the stone by capillary attraction until it strikes one of the grooves 8 or protuberances 9, which will arrest its lateral travel and cause it to precipitate from the surface of the stone by natural accumulation into drops, as illustrated.

The shoulder 5 rests on top of the annular flange 10 forming the top opening of the conical vessel 11 containing statified filtering media, hereinafter more fully described. This vessel 11 is impervious and may be of the same material as the reservoir 1. It is provided in its bottom 12, with a series of holes 13 uniformly spaced therein, through which the filtered water precipitates into the olla 14, the upper opening forms the flange 10 for the shoulder 5 of the reservoir 1. The olla forms a base for the whole structure.

This olla 14 is an Indian medium for cooling water. It is formed of a coarse vitrified clay through which the water permeates and accumulates on the outer surface in the form of a sweat, the evaporation of which lowers the temperature of the olla and its contents, thus cooling the drinking water before its consumption. The drinking water is drawn off from the olla through a suitable faucet, not shown, near its bottom. The olla should be of greater capacity than the reservoir 1 to avoid overflowing the latter.

The filtering media within the chamber 11 is not new in composition, but to the best of my knowledge, I am the first to combine these various elements in the statified arrangement shown.

First in this arrangement is the filtering stone 6. This removes from the water, sediment consisting of the coarser particles of organic or inorganic matter that may be in suspension in the water. The water dropping through the stone 6 is precipitated on the top layer 15 within the vessel 11. This layer is composed of sharp, coarse quartz sand which becomes closely packed and aids in distributing the water evenly before seeping into the next layer. From the top layer 15 the water permeates into the stratum 16 of crushed charcoal. The efficiency of charcoal is well known for the removal of gases, taste, odor, including chlorine and other chemicals that may be added to the city water. It also absorbs a large quantity of the hardness or alkalies that may be in the water.

From the charcoal, the water seeps into the massed stratum 17. This is composed of a pad of pure asbestos mineral fibre. Such pads may be perfectly formed to fit the vessel 11 by wetting the asbestos fibre sufficiently to make it plastic, then squeezing the same in a proper mold to give it shape and the desired degree of density. This form of asbestos is endorsed by the highest authorities for the removal of bacteria, stains or coloring matter, and those elusive impurities that may escape through the preceding strata of filtering matter.

The compact density of this asbestos stratum backs the water up and delays its passage through the preceding layer of charcoal, thus increasing the duration of the chemical reactions therein. The density of the asbestos pad further acts to mechanically retain any small particles of charcoal dust that would otherwise precipitate into the olla, which is one of the disadvantages of most filters using charcoal.

From the layer 17, the purified water passes into another stratum 18 of fresh, sharp sand similar to the layer 15, interposed between the stratum 7 and the bottom 12 of the vessel 11. This layer of sand 18 arrests any fibres of asbestos that may detach themselves from the layer above and also prevents the asbestos mass from packing into and sealing the top of the holes 13, thus insuring a free evenly distributed flow through the bottom 12 into the body of the olla.

Should this filtering matter within the chamber 11, through neglect or other causes, become clogged or impervious, I provide an overflow opening 19 through the wall thereof above the layer 15, so that any water accumulating therein will flow directly into the olla and prevent an overflow of the chamber 11 at the point 5, for obvious reasons.

I am aware that asbestos mats have been superimposed upon filtering stone such as 6 but are unsuccessful at this point because they are subject to sliming, accumulations of silt and other impurities that soon render them impervious to filtration. Furthermore, at this initial stage the asbestos mat is called upon to handle impurities that it is not best adapted to separate from the water at this point. Its greatest efficiency is in handling bacteria, odor and organic stains that may be present in the water, such as water impregnated with heat, sulphur, iron and other discoloring substances.

By my combination and arrangement of the various filtering media the water is subjected to each at the point where the water content is acted upon most efficiently by the particular stratum through which it may be then passing. The particular advantage of this new mode of operation is that the water is more rapidly filtered and the various filtering media are not subject to clogging by substances that they are not adapted to separate from the water.

Having thus described this invention what I claim and desire to secure by Letters Patent is:

1. A filter comprising a reservoir with a porous bottom having substantially vertical drip forming surfaces in its under side portion; a chamber beneath said reservoir having a perforated bottom and superimposed strata of sand, charcoal, asbestos, and sand arranged therein in the order named.

2. A filter comprising a porous horizontal plate, said plate having upon the under side thereof a series of shallow circular grooves to insure discharge of the filtered liquid from a plurality of points throughout the area of said filter.

3. A filter comprising a reservoir, a porous bottom upon said reservoir, grooves upon the under side of said bottom for securing discharge of the filtered water therefrom throughout the entire area thereof, a chamber to receive said water to further filter the same having a perforated bottom, a layer of asbestos fibre in said chamber and a layer of sand between said perforated bottom of said chamber and said asbestos fibre to prevent said fibre from clogging said perforated chamber bottom.

In testimony whereof I have hereunto affixed my signature.

CARL B. LANCASTER.